M. B. PARKER.
FREEZE EXPANSION ABSORBING DEVICE.
APPLICATION FILED OCT. 6, 1919.
1,381,426.
Patented June 14, 1921.
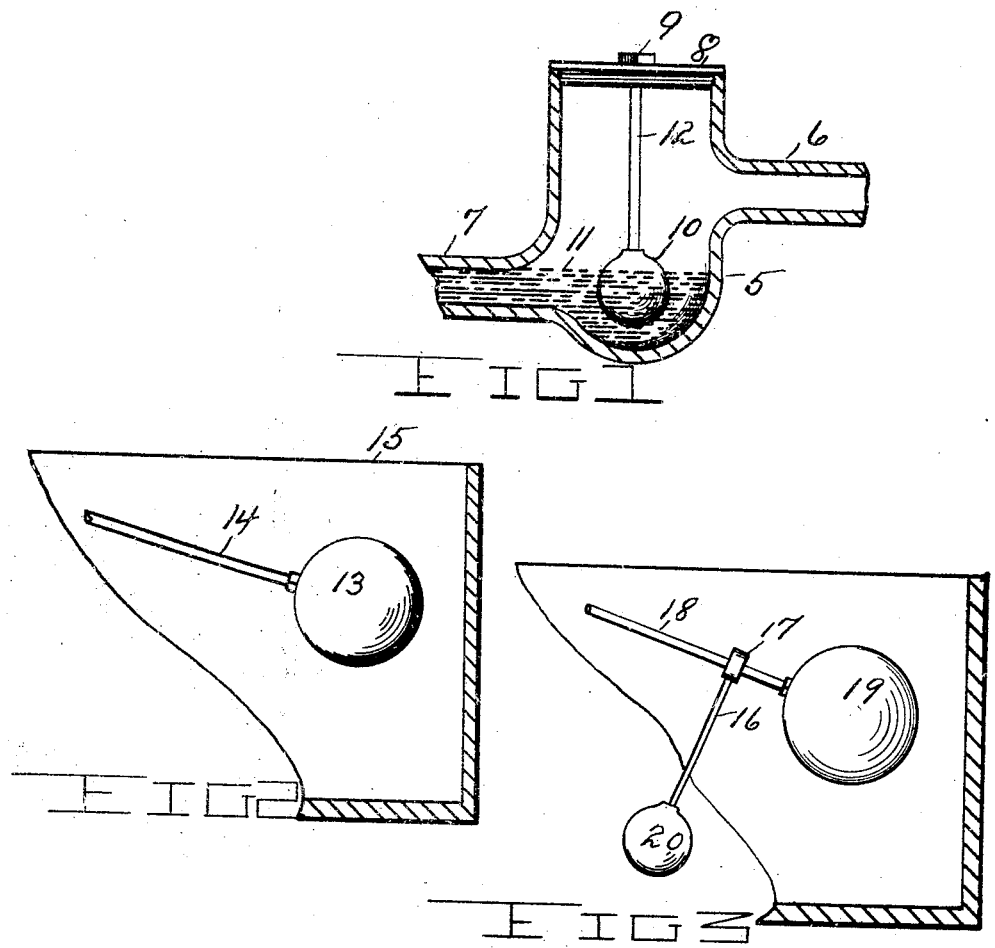
INVENTOR.
Mannio B Parker
BY
ATTORNEY.

UNITED STATES PATENT OFFICE.

MANNIE B. PARKER, OF OKLAHOMA, OKLAHOMA.

FREEZE-EXPANSION-ABSORBING DEVICE.

1,381,426.  Specification of Letters Patent.  Patented June 14, 1921.

Application filed October 6, 1919. Serial No. 328,812.

*To all whom it may concern:*

Be it known that I, MANNIE B. PARKER, a citizen of the United States, and a resident of Oklahoma city, county of Oklahoma, and State of Oklahoma, have invented a new Invention in Freeze-Expansion-Absorbing Devices, of which the following is a specification.

This invention relates to traps and means in the same for preventing the freezing water from bursting the same.

The object of the invention is to displace the water by a flexible element to give when expansion due to freezing takes place.

On the drawing, accompanying and forming a part of this specification, and whereon is shown one or more of some of the practical forms of the invention—

Figure 1 is an elevation and sectional view of a trap with invention applied in one of its forms, Fig. 2 is a fragmented view of a flush box for lavatory with float fitted to accomplish the desired result, Fig. 3 is a view similar with the invention additionally applied to the float.

In these several views similar characters of reference indicate similar parts throughout.

Referring to Fig. 1 the trap 5 is the usual floor type, with its branches 6 and 7. It has the usual cap 8 screw-threaded, and sent to place by nut 9. Within this trap there is provided a freeze-expansion absorbing device 10 which not only displaces the fluid 11, but which will collapse when the fluid 11 sets in to solidify, and according to the intensity of the solidification so also will the collapse of the member 10 obtain. This member, in the present instance may be an elastic one, such for instance as bulbs which are commonly used in plumbing, and although this may be held in operative position in any suitable manner from any point within the traps, for convenience it is shown as suspended from a stem 12 depending from the cap 8 of the trap of Fig. 1.

As previously suggested, however, this is not necessarily important as a means of holding the collapsing and absorbing instrumentality since, so far as it is necessary to keep the device partly in the fluid 11 any means for so locating the member 10 may be employed within the purview of the invention.

By reference to Fig. 2 the float 13 leading from the lever 14 within the flush box 15 is of collapsible material to form a freeze expansion absorbing instrumentality, so that when the fluid commences to crust through surface solidification the float will collapse and give way to expansion, as may be seen. In order to further provide for further solidification to a greater depth than the mere surface, the lever of Fig. 3 is provided with a supplemental lever 16 maintained by a collar 17 upon lever 18, supporting the collapsible float 19, and to this lever 16 is applied a collapsible freeze absorbing device 20 which will permit displacement due to expansion from freezing at a depth below the surface of the contained fluid.

While all this detail has been specified to comply with statute, let it be understood that the essential of invention resides broadly in providing a means of displacement in a body of fluid, collapsible upon the expansion of the fluid, particularly at the instant of solidification, to absorb the expansion to protect the wall of the fluid container against rupture.

The particular method of controlling or holding the absorber is not a matter but of mechanical skill, and so long as the absorber is partly or completely submerged relative to the fluid, the conception of invention will be dignified.

Having thus described this invention I claim:—

In a device of the kind described, the combination with a containing trap, of an internally located and suspended flexible member for displacing the upper part of the fluid contained, and means for holding the flexible member in depending suspension and spaced from the bottom of the trap.

Signed at Oklahoma, in the county and State of Oklahoma this second day of October, in the year 1919.

MANNIE B. PARKER.